(12) United States Patent
Baszucki

(10) Patent No.: US 8,537,165 B2
(45) Date of Patent: Sep. 17, 2013

(54) METHOD AND APPARATUS FOR AUTOMATIC COALESCENCE OF CONNECTED RIGID BODIES

(75) Inventor: David B. Baszucki, Portola Valley, CA (US)

(73) Assignee: Roblox Corporation, Menlo Park, CA (US)

( * ) Notice: Subject to any disclaimer, the term of this patent is extended or adjusted under 35 U.S.C. 154(b) by 1338 days.

(21) Appl. No.: 12/214,482

(22) Filed: Jun. 18, 2008

(65) Prior Publication Data

US 2009/0315885 A1 Dec. 24, 2009

(51) Int. Cl.
*G06T 13/00* (2011.01)

(52) U.S. Cl.
USPC ............ 345/474; 345/419; 345/473; 345/475

(58) Field of Classification Search
USPC ...................... 345/473–475, 419, 373–375
See application file for complete search history.

(56) References Cited

U.S. PATENT DOCUMENTS

| | | | | |
|---|---|---|---|---|
| 5,625,575 A | * | 4/1997 | Goyal et al. ...................... | 703/6 |
| 5,755,620 A | * | 5/1998 | Yamamoto et al. .............. | 463/34 |
| 5,835,693 A | * | 11/1998 | Lynch et al. ................... | 345/473 |
| 6,040,839 A | * | 3/2000 | Van Eldik et al. ............. | 345/619 |
| 6,191,798 B1 | * | 2/2001 | Handelman et al. .......... | 345/473 |
| 6,407,748 B1 | * | 6/2002 | Xavier ........................... | 345/672 |
| 6,556,206 B1 | * | 4/2003 | Benson et al. ................. | 345/473 |
| 7,403,202 B1 | * | 7/2008 | Nash .............................. | 345/474 |
| 7,421,303 B2 | * | 9/2008 | Zhang et al. .................... | 700/45 |
| 7,788,071 B2 | * | 8/2010 | Bond et al. ......................... | 703/6 |
| 2004/0139103 A1 | * | 7/2004 | Boyce et al. .................. | 707/102 |
| 2006/0258447 A1 | * | 11/2006 | Baszucki et al. ............... | 463/31 |

OTHER PUBLICATIONS

Zoran Popović; and Andrew Witkin, Aug. 8-13, 1999, "Physically based motion transformation", Proceedings of the 26th annual conference on Computer graphics and interactive techniques (SIGGRAPH '99), ACM Press/Addison-Wesley Publishing Co., New York, NY, USA, pp. 11-20.*
Adrian Boeing and Thomas Bräunl, Dec. 2007, "Evaluation of real-time physics simulation systems", Proceedings of the 5th international conference on Computer graphics and interactive techniques in Australia and Southeast Asia (GRAPHITE '07), ACM, New York, NY, USA, pp. 281-288.*
D'Amora, B.; Nanda, A.; Magerlein, K.; Binstock, A.; Yee, B.; , "High-performance server systems and the next generation of online games," IBM Systems Journal , vol. 45, No. 1, pp. 103-118, Jan. 12, 2006.*

(Continued)

*Primary Examiner* — Kimbinh T Nguyen
(74) *Attorney, Agent, or Firm* — Lowenstein Sandler LLP

(57) ABSTRACT

The present invention pertains to a method and apparatus for simulating the motion of three dimensional models, toys, games, etc. In one embodiment, the method may include receiving a plurality of three dimensional objects for motion simulation. The method may also include determining at least two three dimensional objects from the plurality of three dimensional objects that do not move relative to each other during motion simulation. A super body may then be constructed that represents the determined at least two three dimensional objects, and a motion of the super body computed at a physics simulation engine to simulate motion of the super body and any remaining three dimensional objects that are not part of the super body.

21 Claims, 12 Drawing Sheets

(56) References Cited

OTHER PUBLICATIONS

Erleben, K.; Sporring, J.; Henriksen, K.; Dohlmann, H.; "Physics Based Animation", Copyright 2005 by Thomson Delmar Learning, Published by Charles River Media, Inc., 67 pages, from the Preface, Introduction and Chapters 7, 12 and 15, publication date Aug. 9, 2005.*

Hansson, H., "Craft Physics Interface", University of Linköping, Department of Electrical Engineering; Linköping: LiTH-ISY-EX—07/3887—SE, Feb. 15, 2007. (http://scholar.google.com/scholar?cluster=5011119394582813149&hl=en&as_sdt=0,47).*

Jijun Wang; Lewis, M.; Gennari, J.; , "A game engine based simulation of the NIST urban search and rescue arenas," Proceedings of the 2003 Winter Simulation Conference, 2003, pp. 1039-1045, vol. 1, Dec. 7-10, 2003.*

Wikipedia, Definition of Microcode, 14 pages, retrieved by Examiner on Jun. 3, 2012 from: http://en.wikipedia.org/wiki/Microcode.*

Marco Zaratti, Marco Fratarcangeli, Luca Iocchi, "A 3D Simulator of Multiple Legged Robots Based on USARSim", RoboCup 2006: Robot Soccer World Cup X, Springer-Verlag, Berlin, Heidelberg, Dec. 2006.*

* cited by examiner

METHOD AND APPARATUS FOR AUTOMATIC COALESCENCE OF CONNECTED RIGID BODIES

FIELD OF THE INVENTION

This invention relates to the field of computer-aided modeling of virtual reality and, in particular, to the computer-aided simulation of three dimensional models, toys, games, etc.

BACKGROUND

Building and playing with models online is becoming increasingly popular among various users. Internet-based virtual worlds are simulated, enabling users to travel within a virtual world, play games within the virtual world, and interact with other inhabitants (i.e., other users) of the virtual world.

Such virtual environments may utilize physics simulation to provide physical realism to the appearance and movement of objects in the virtual environment. Certain objects, such as buildings, cars, trains, etc., which are provided by virtual world environments are composed of multiple parts, with certain parts joined together. For example, a car in a virtual environment can be constructed of hundreds or thousands of parts that are modeled as rigid bodies and connected by physics joints. The physics joints restrict relative motion of parts when a motion of the car is simulated in the virtual environment.

With such structures, that consist of many parts, there is computational overhead that impacts physics simulation, and the transmission, display, and rendering of virtual environments. For example, a large building can be constructed out of three dimensional (3D) virtual blocks that are connected with physically simulated welds (or some other type of rigid joints). If some blocks at the bottom of the building are removed, the simulated building will fall over. There is, however, computational overhead exerted on the simulation as the collection of 3D virtual blocks move. Each of the 3D virtual blocks is connected by rigid joints, where the rigid joints must be simulated thereby incurring a computational expense at the physics simulation engine. That is, a building constructed of 10,000 blocks would require the simulation of thousands of joints, welds, etc. between the individual parts.

Furthermore, there is a significant bandwidth expense for transmitting 3D objects over a network, especially in a multiplayer online environment. A 3D game server, that provides physical simulation to a virtual environment, sends the positions and orientation of the individual blocks to multiple client devices over a network. As the number of individual blocks and client devices grows the impact and load requirements placed on network bandwidth are multiplied creating an enormous bandwidth expense in providing the multiplayer online environment.

BRIEF DESCRIPTION OF THE DRAWINGS

The present invention is illustrated by way of example, and not by way of limitation, in the figures of the accompanying drawings and in which.

DETAILED DESCRIPTION

Figure 1A:
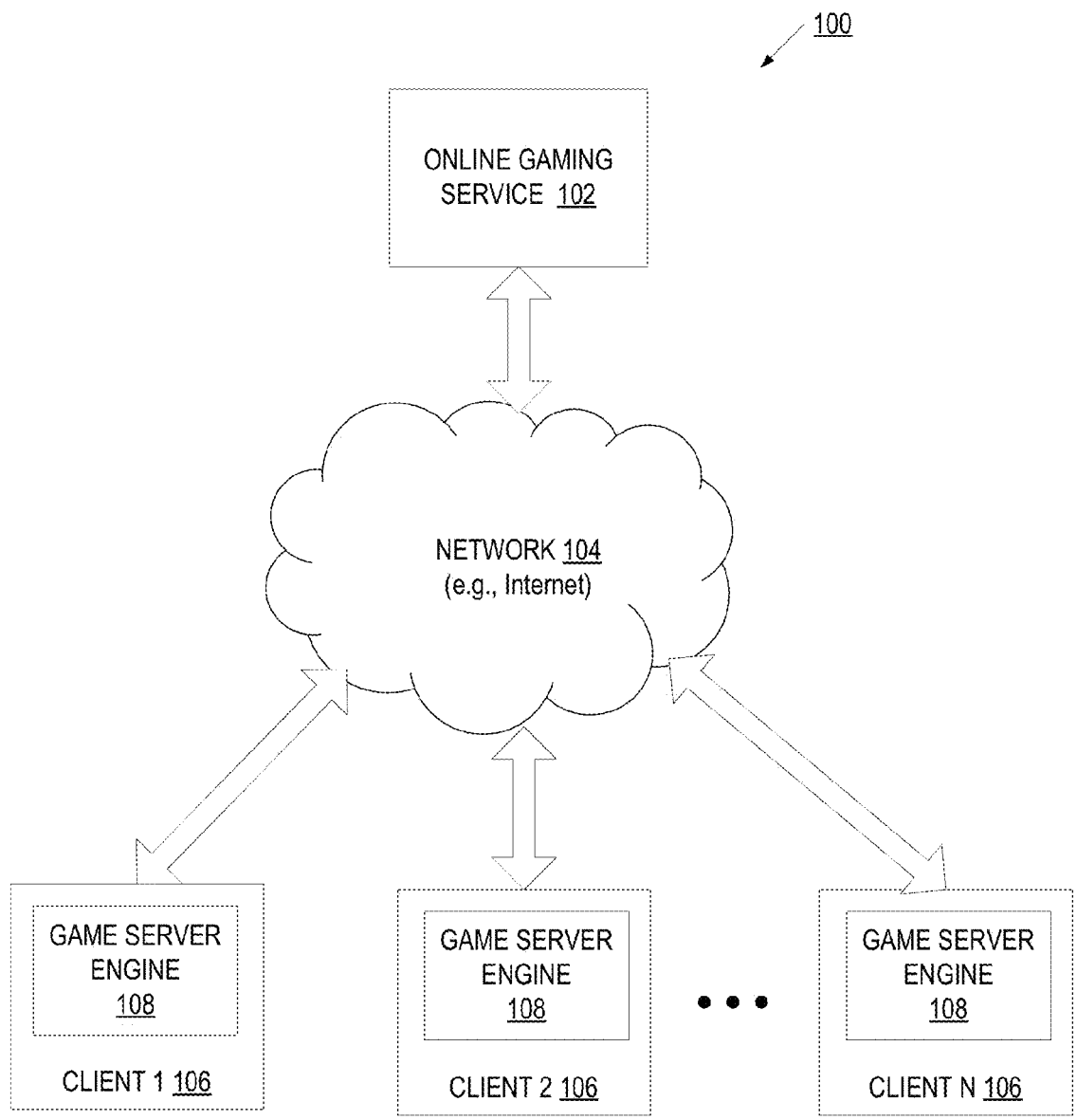
FIG. 1A illustrates one embodiment of network architecture in which embodiments of the present invention may operate.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

The present invention may also be practiced in distributed computing environments where the machine readable medium is stored on and/or executed by more than one computer system. In addition, the information transferred between computer systems may either be pulled or pushed across the communication medium connecting the computer systems.

Some portions of the description that follow are presented in terms of algorithms and symbolic representations of operations on data bits that may be stored within a memory and operated on by a processor. These algorithmic descriptions and representations are the means used by those skilled in the art to effectively convey their work. An algorithm is generally conceived to be a self-consistent sequence of acts leading to a desired result. The acts are those requiring manipulation of quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, parameters, or the like.

A method and apparatus for building online toys, models, games, etc. is described. In one embodiment, a plurality of three dimensional objects is received for simulation in a three dimensional (3D) virtual environment. The plurality of 3D objects may include physical structures, machines, people, etc. For convenience, physical structures, machines, people, etc. shall be referred to herein as physical structures. As physical structures are created in a virtual environment, at least two 3D objects from plurality of 3D objects that do not move relative to each other are determined. Such 3D objects that do not move relative to one another can be referred to as a cluster, and the 3D objects that compose the cluster are referred to as cluster bodies. In one embodiment, for each cluster, a super body that represents the cluster is constructed without physics joints between the cluster bodies, and a motion of the super body is computed.

In one embodiment, the super body and the determined motion are transmitted over a network. From the motion of the super body, the 3D objects that correspond to the super body may be reconstituted, thereby simulating a motion of the cluster of 3D objects when displayed by a display device. Where a virtual environment, such as a multiplayer online environment or a game development environment, is simulated on a user system, super bodies are computed and transmitted to the client for each frame of motion simulation displayed. In another embodiment, the motion of super bodies is computed on the server for each frame of physics simulation, but the motion is transmitted to clients intermittently. Clients then use interpolation and extrapolation schemes to handle the intermittent motion data coming from the server.

FIG. 1A illustrates one embodiment of network architecture 100 in which embodiments of the present invention may operate. The architecture 100 includes an online gaming service 102 coupled to a communications network 104 such as a public network (e.g., the Internet, a wireless network, etc.) or a private network (e.g., LAN, Intranet, etc.). The online gaming service 102 communicates with multiple user systems, such as client devices (clients 1 through client N) 106 via the network 104.

Each client 106 hosts a game server engine 108. The game server engine 108 is responsible for allowing a user to build models, play games, and navigate throughout virtual environments that are physically realistic in a 3D virtual world. Models are constructed from parts, or 3D virtual objects, that automatically join together to aid the user in editing. A part may be a primitive geometrical shape such as a block, a cylinder, a sphere, etc., or some other primitive shape such as a wedge, a torus, a tube, a channel, etc. A Part may also be a complex shape defined by a collection of polygons or analytical surfaces. Games are created by placing models in the 3D world. Games incorporate gameplay logic that triggers game events. The game server engine 108 may publish a user's model or game by transferring the model or the game to the online gaming service 102.

The online gaming service 102 is responsible for storing models and games created by users of the clients 106. A user may be, for example, a young child (e.g., 6-10 years old), an older child, a teenager, or an adult. In one embodiment, the online gaming service 102 maintains a game catalog and a model catalog that may be presented to users in a window of a browser application running on a corresponding client 106 or a window controlled by the game server engine 108. A user may select a game (created by this or other user) from the game catalog to play. The game catalog includes images of games stored on the online gaming service 102. In addition, a user may select a model (created by this or other user) from the model catalog to modify and/or add to a new game. The model catalog includes images of models stored on the online gaming service 102. In one embodiment, the online gaming service 102 conducts contests for model building, game building, or high scores in individual games.

Figure 1B:
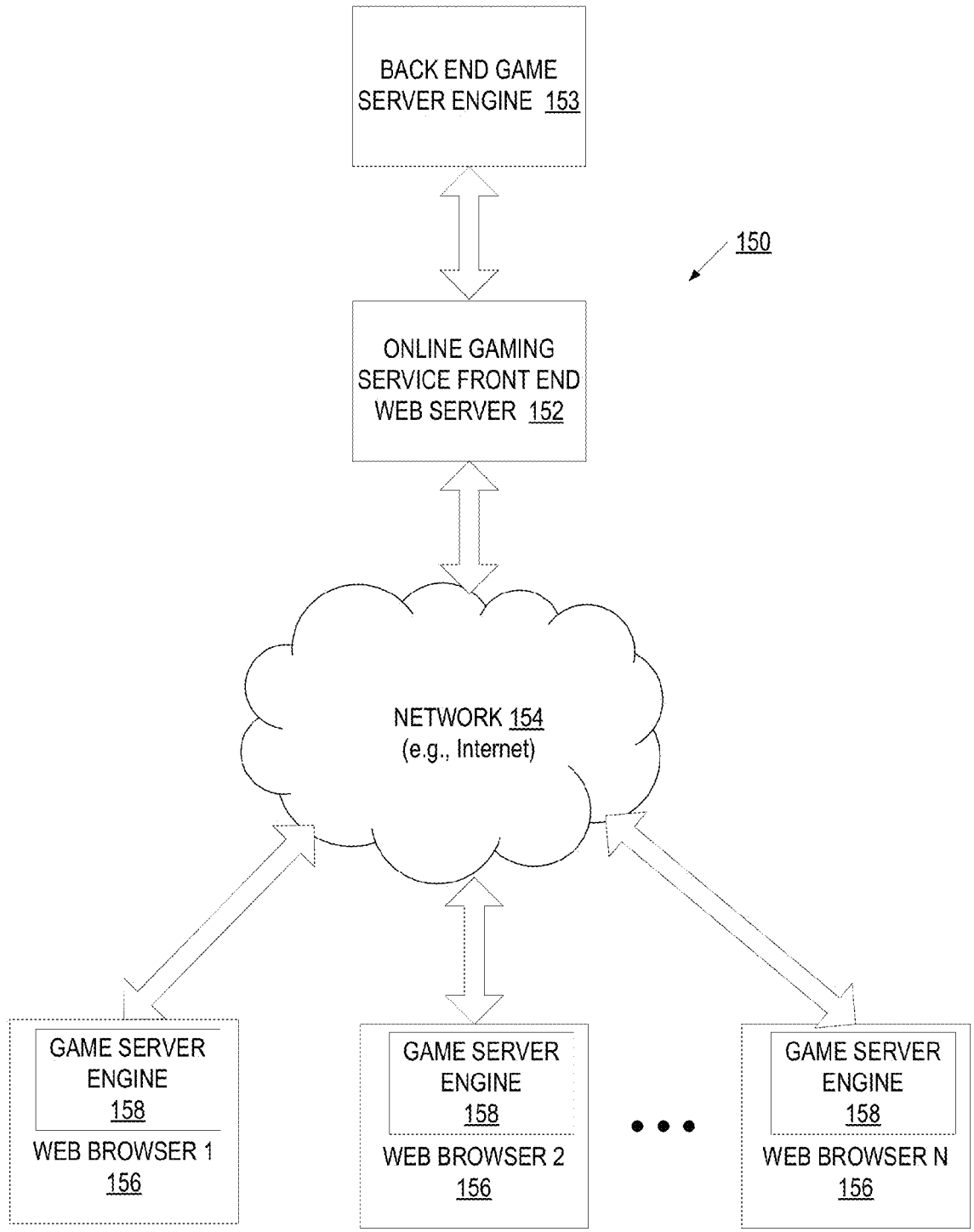
FIG. 1B illustrates another embodiment of network architecture in which embodiments of the present invention may operate

FIG. 1B illustrates one embodiment of network architecture 150 in which embodiments of the present invention may operate. The architecture 150 includes an online gaming service front end web server 152 coupled to a communications network 154 such as a public network (e.g., the Internet, a wireless network, etc.) or a private network (e.g., LAN, Intranet, etc.), and coupled to a back end game server engine 153. The online gaming service front end server 152 communicates with multiple user systems, such as web browsers (browser 1 through browser N) 156 via the network 154.

Front end web server 152 communicates with back end game server engine 153 so that back end game server engine 152 can enable web browsers 156 to build models, play games, and navigate throughout virtual environments that are physically realistic in a 3D virtual world.

Each web browser 156 can provide local processing through JavaScript or a plugin application such as Java, Flash, Shockwave, Silverlight, Active-X, etc. application. Furthermore, game server engine 158 is provided to web browser applications from back end game server engine 153. Thus a game server engine 158 running in web browsers 156, can communicate with back end game server engine 153 over network 154 to enable a user of a web browser 156 to build models, play games, and navigate throughout virtual environments that are physically realistic in a 3D virtual world on a web browser. The online gaming service front end server 152 is responsible for storing models and games created by users of the web browsers 156.

Figure 2:
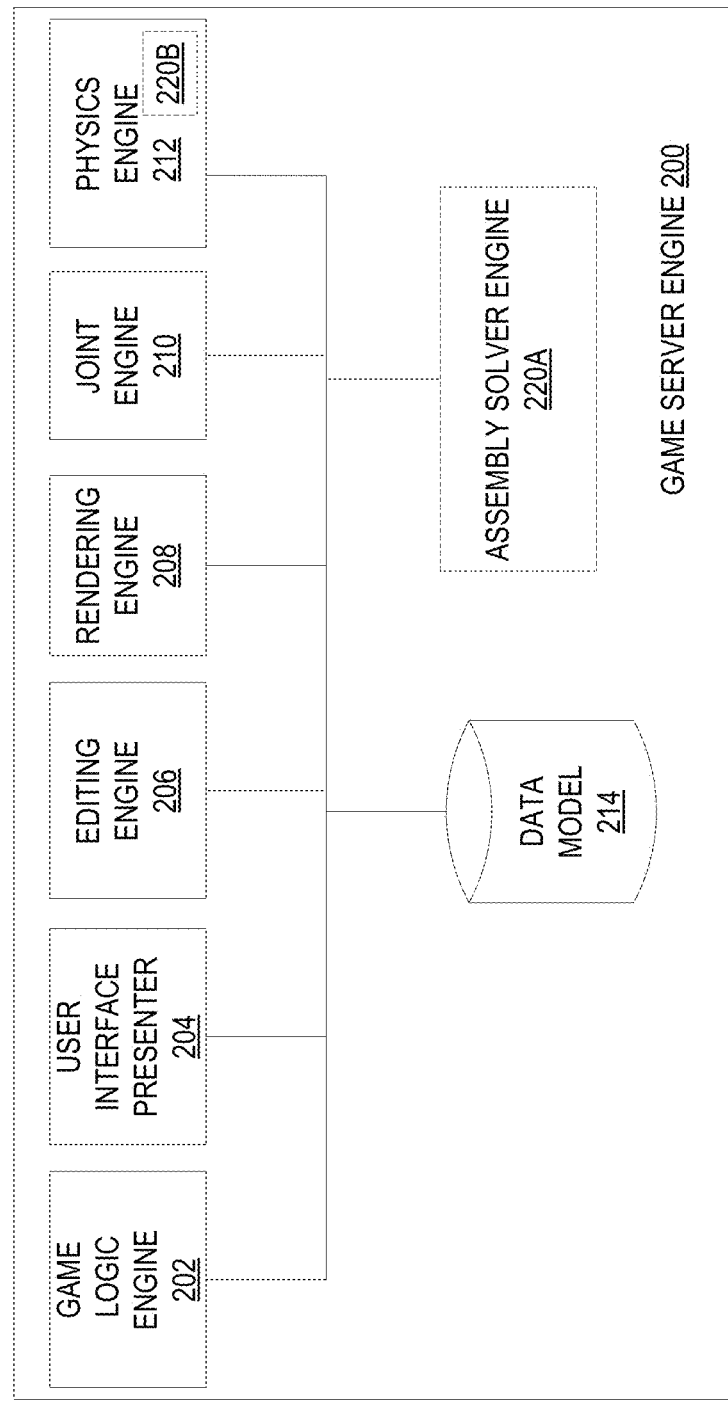
FIG. 2 is a block diagram of one embodiment of a game server engine.

FIG. 2 is a block diagram of one embodiment of a game server engine 200 (e.g., game server engine 108 of FIG. 1A, game server engine 158 of FIG. 1B, or back end game server engine 154 of FIG. 1B). The game server engine 200 may include a game logic engine 202, a user interface presenter 204, an editing engine 206, a rendering engine 208, a joint engine 210, physics engine 212, a data model 214, and an assembly solver engine 220A. In one embodiment, assembly solver engine 220A may be a standalone engine of game server engine 200, or included in physics simulation engine 212, as illustrated by box 220B.

The game logic engine 202 is responsible for invoking components of the game server engine 200 based on user requests, and exchanging data with the online gaming service 102 based on user requests.

The user interface presenter 204 is responsible for generating user interfaces (UIs), presenting UIs to a user and receiving input provided by the user via the UIs. In one embodiment, UIs are presented in a window(s) of a browser application (i.e., a Flash, Java plug-in, Shockwave, Silverlight, etc. browser application) running on a user system. Alternatively, UIs may be presented in a window(s) controlled by the game server engine 200. The UIs provided by the user interface presenter 204 may include, for example, a home page UI, a build UI, a game catalog UI, a model catalog UI, etc. The home page UI may present to a user a list of available options (e.g., to build a new model or game, to access an existing model or game, etc.). The build UI may allow a user to select desired parts and/or models and may display the selected parts and/or models in a 3D virtual world.

The editing engine 206 is responsible for editing new and existing games and models based on user input, defining properties of new and existing models and games, and creating and updating a data model 214 for each new and existing model and game. A data model 214 is a collection of data describing a game or a model that is structured using a specific format (e.g., XML schema, binary or proprietary format).

The joint engine 210 is responsible for joining parts based on their proximity to each other in the 3D world as will be discussed in more detail below.

The rendering engine 208 is responsible for interpreting and displaying 3D images of models and games within the 3D view.

The physics engine 212 is responsible for simulating the motion of objects (models and/or parts) displayed in the 3D view. In one embodiment, the physics engine 212 simulates the object motion by computing object position and orientation on a frame by frame basis. In one embodiment, physics engine 212 computes object position and orientation periodically (e.g., 30 times per second).

The assembly solver engine 220A or 220B, is responsible for receiving a plurality of 3D objects and determining two or more 3D objects that do not move positions relative to each other during a frame of motion simulation. In one embodiment, the assembly solver engine 220A or 220B creates one or more super bodies that are provided to physics engine 212 on a frame by frame basis, instead of providing individual 3D virtual objects that make up the super bodies and the rigid joints between the 3D virtual objects. However, 3D objects that are not determined to be part of a super body are provided to the physics simulation engine 212 individually, as well as joints between the 3D objects and super bodies.

Figure 3:
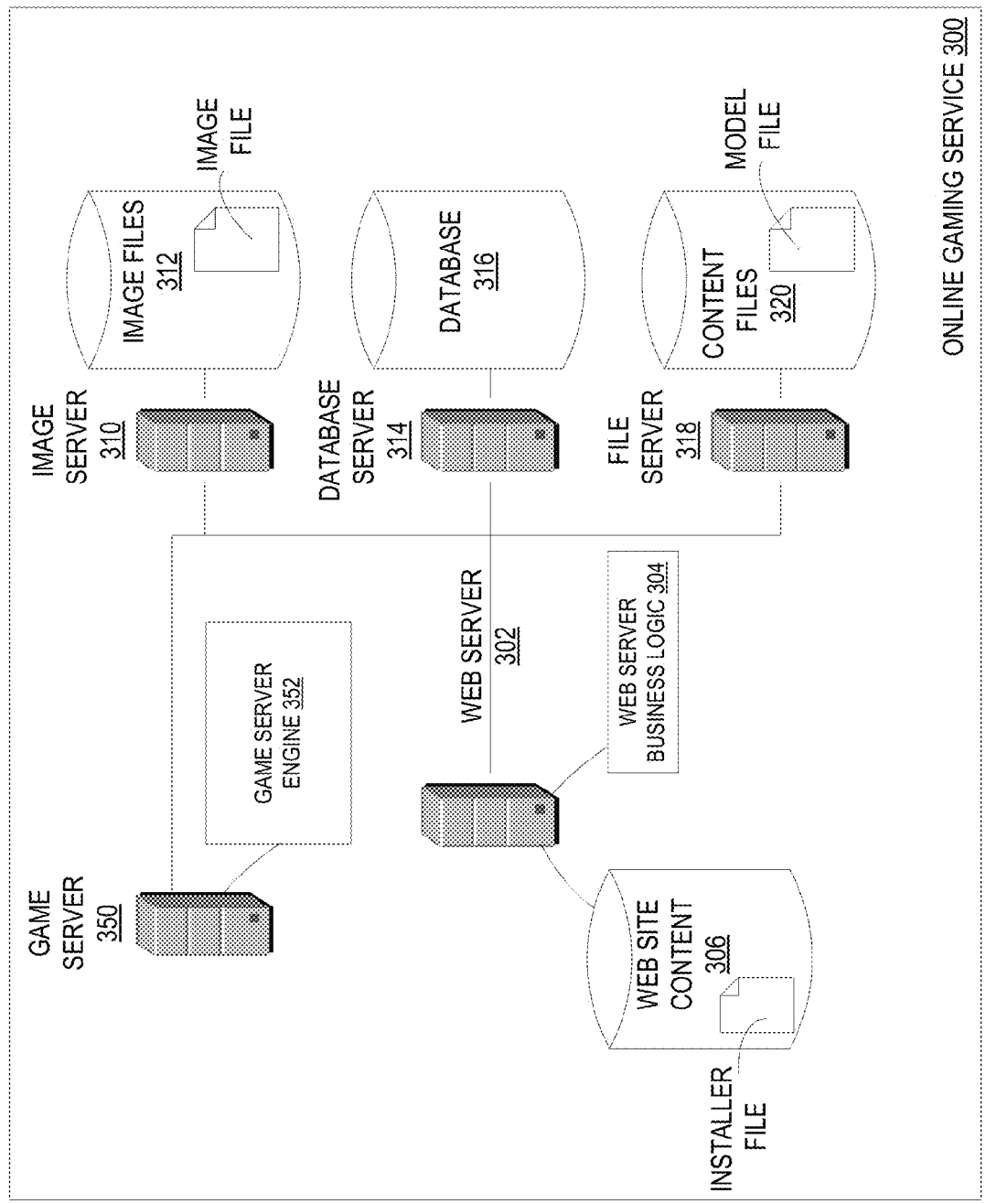
FIG. 3 illustrates one embodiment of the architecture of an online gaming service.

FIG. 3 illustrates one embodiment of the architecture of an online gaming service 300. The online gaming service 300 includes a web server 302, an image server 310, a database server 314 and a file server 318.

The file server 318 stores content files 320 received from user systems (such as clients 106 and/or web browsers 156). The content files 320 include files of models and games created by the users of user systems. These files may be, for example, in extensible markup language (XML) format, binary format, etc. The content files 320 may also include various large media files such as textures, skyboxes, sounds, etc.

The image server 310 stores images files 312 that include images of models and games stored on the file server 318.

The database server 314 hosts a database 316 that stores, for example, profile information of each user, account information of each user, game and model information, news information, information pertaining to online forums maintained by the online gaming service 300, etc. The profile information of each user may specify, for example, games created by a user, models created by a user, public information about a user (e.g., "About Me"), recently played games, favorite games, user scores and ratings, etc. The account information may include, for example, user ID and password. The game and model information may include, for example, indexes of game and model files, indexes of corresponding game and model images, game creators, game creation dates, game popularity, user rankings of games, etc. The news information may include, for example, general information about games, information about current contests (e.g., rewards offered for users who achieve high scores for a game, etc.), etc. The forum information may include, for example, discussions about games and models, technical support forum information, etc.

The web server 302 hosts web site content 306 and web server logic 304. The web server logic 304 receives content requests from clients 106 and/or web browsers 156, and sends pages (e.g., HTML pages) with the requested content to the clients 106 and/or web browsers 156. In one embodiment, the web server logic 304 is responsible for composing model and game catalogs with images of models and games from the image server 310, and sending pages containing these catalogs to the clients 106 and/or web browsers 156. The web site content 306 may include, for example, model and game catalogs, cached model and game files, an installer file for a game server engine 108 transmitted to a client 106, etc.

The game server 350 hosts a game server engine 352. In one embodiment, a physics engine and assembly solver engine of game server engine 352 operate in the same fashion as that discussed above with respect to FIG. 2, and as will be discussed in greater detail below.

In one embodiment, the physics engine 212 and assembly solver engine 220A or 220B of game server engine 200 enable a user system, such as a client system or web browser application, that edits and manipulates 3D objects, models, and structures, to create and transmit super bodies to online gaming service 300. Furthermore, the physics simulation engine and assembly solver engine of game server engine 352 hosted by game server 350, enable online gaming service 300 to create and transmit super bodies to a plurality of user systems, such as clients 106 of FIG. 1A and/or web browsers 156 of FIG. 1B. Because client applications, web browser applications, and an online gaming service calculate motion of objects, which is in turn communicated as super bodies, the computational overhead associated with rending a virtual online environment, editing objects in a virtual environment, and transmission of virtual environments to multiple clients is dramatically reduced.

Figure 4:
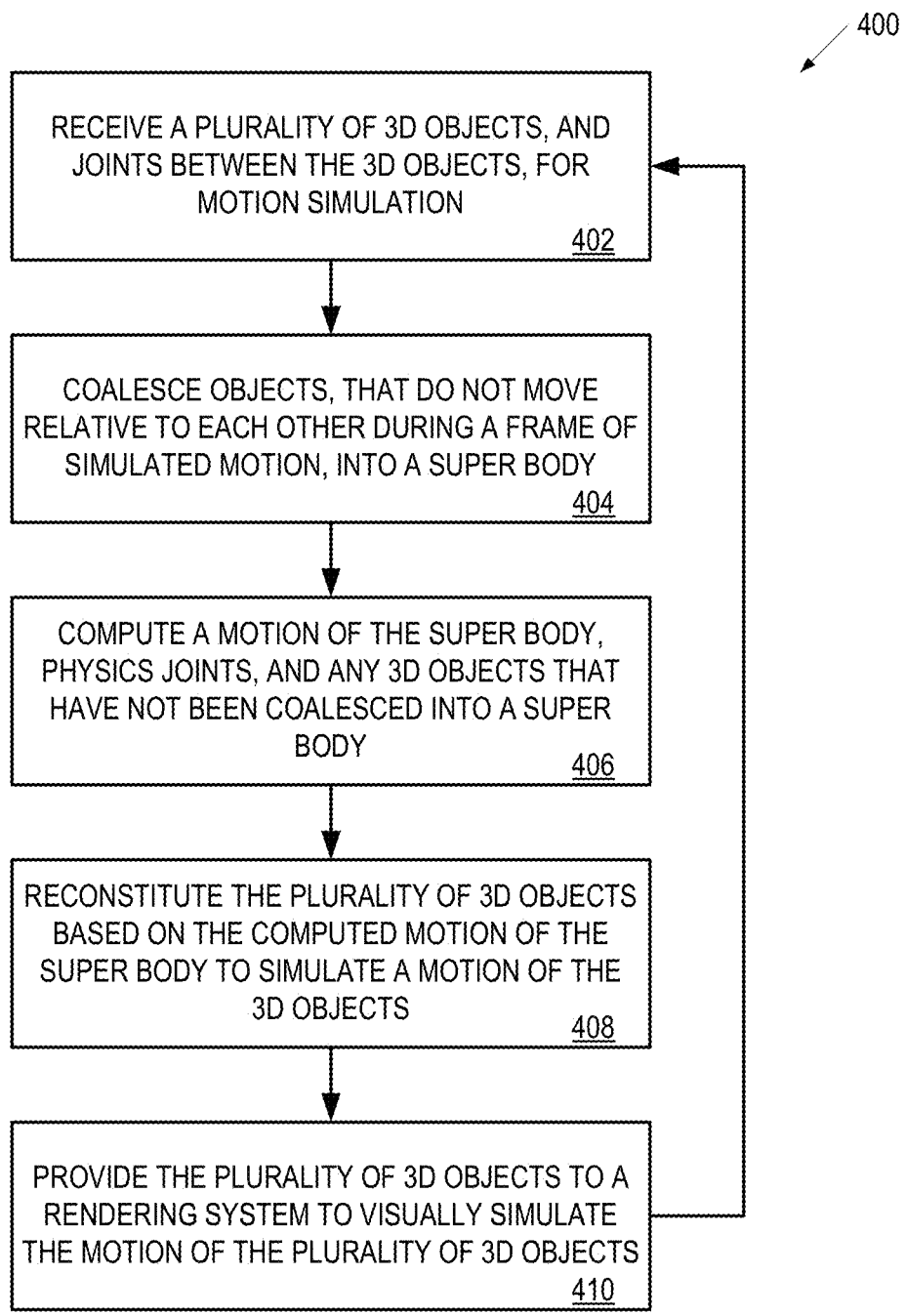
FIG. 4 is a flow diagram of one embodiment of a process for creating and utilizing super bodies in a 3D virtual environment.

FIG. 4 is a flow diagram of one embodiment of a process 400 for creating and utilizing super bodies in a 3D virtual environment. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in one or more game server engines 200 of FIG. 2.

Referring to FIG. 4, process 400 begins with processing logic receiving a plurality of 3D objects, and physics joints between 3D objects, for motion simulation (processing block 402). In one embodiment, the 3D objects may be received by an online gaming service that is hosting a 3D virtual environment, 3D virtual world or 3D virtual game to one or more clients. In one embodiment, the 3D objects may be received by a client that is editing, or otherwise manipulating, a 3D structure, model, person, etc. controlled by an online gaming service.

At processing block 404, processing logic coalesces objects, that do not move relative to each other during a frame of simulated motion, into a super body (processing block 404). In one embodiment, processing logic analyzes a collection of 3D objects, such as a collection of blocks, cylinders, spheres, etc., any physics joints between those objects, and a body/joint graph that represents the 3D objects. Processing logic analyzes the collection of 3D objects in order to determine which objects, from the collection, do not move relative to one another during a frame of motion simulation. Thus, in one embodiment, processing logic determines which objects in the collection form clusters, so that the cluster may be coalesced into a super body.

Processing logic then computes a motion of the super body, and any 3D objects and joints that have not been coalesced into a super body (processing block 406). Based on the computed motion, the plurality of 3D objects may be reconstituted from the super body by the processing logic to simulate a motion of the 3D objects (processing block 408).

In one embodiment, processing logic then provides the plurality of 3D objects to a rendering system to display and visually simulate a motion of the plurality of 3D objects (processing block 410). Processing logic then returns to processing block 402 to repeat blocks 402-410, in order to provide a frame by frame rendering of 3D objects utilizing super bodies during motion simulation.

Figure 5A:
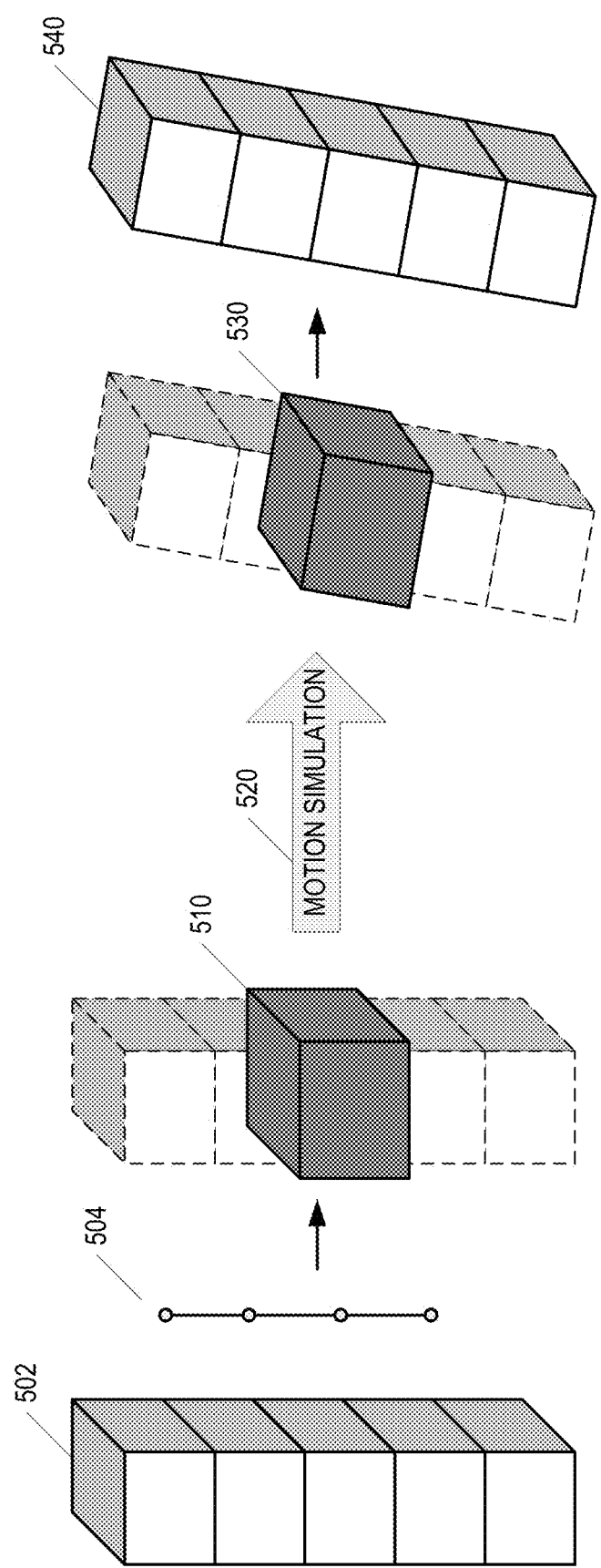
FIG. 5A illustrates one embodiment of motion simulation utilizing a super body.

For example, FIG. 5A illustrates one embodiment of motion simulation utilizing a super body. Five 3D objects with four rigid joints 502, and the object/joint graph 504, are illustrated. As discussed herein, the 3D objects and graph are analyzed to determine which objects will not move relative to each other within a frame of motion simulation in a virtual environment. In one embodiment, the analysis is performed by an assembly solver engine, such as the assembly solver engines illustrated and discussed in FIG. 2. Upon completion of the analysis, 3D objects that do not move relative to one another may be clustered together and a super body 510 constructed to represent the 3D objects. As illustrated, the five 3D objects are clustered into the one super body 510.

In one embodiment, the super body 510 is processed by a physics simulation engine, such as those illustrated and discussed above with respect to FIG. 2, that performs motion simulation 520 on super body 530. Based on the computed motion of super body 530 (i.e., the new position, velocity, acceleration, etc.), the five 3D objects may be reconstituted to reflect the motion of the original five 3D objects 540.

As illustrated in FIG. 5, a motion of the super body, and not the motion of five 3D objects with 4 physics joints, was subject to motion simulation 520. As a result, the physics engine did not have to dedicate compute time to calculate the various motions and joints, such as joint forces between bodies, thereby reducing computation overhead and increasing the efficiency of the motion simulation. Such increases in efficiency, and reduction in required computation power, are desirable in 3D virtual worlds that involve multiplayer environments.

Figure 5B:
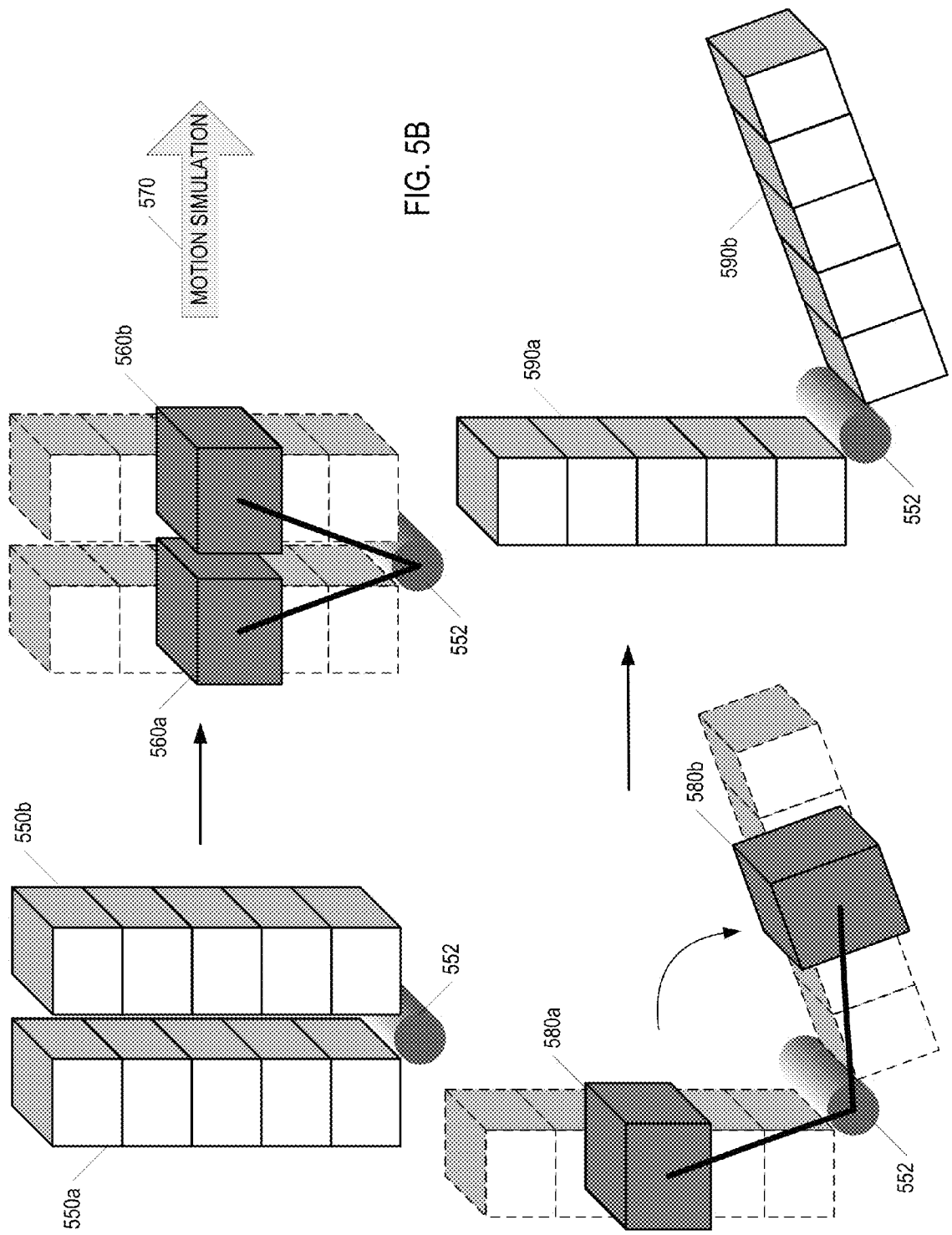
FIG. 5B illustrates another embodiment of motion simulation utilizing a super body

FIG. 5B illustrates an example of the motion of a drawbridge utilizing superbodies as discussed herein. In the example, three dimensional objects that represents door 550*b* are connected to three dimensional objects that represents wall 55*a* via a revolute hinge joint 552 to allow the drawbridge to open and close. The structure of 3d objects that make up door 550*b* of the drawbridge can be clustered together into a super body 560*b* that represents the door. Further, the structure of three dimensional objects that make up wall 550*a* that support the door, via revolute joint 552 can be clustered together into a super body 560*a* that represents the door. However, the hinge 552 that provides the up and down motion of the drawbridge is not part of either cluster. Thus, a motion of the hinge 552, the super bodies 560*a* and 560*b* (i.e., coalesced clusters of 3D objects) that represent the gate and the wall, and the physics joints between the super bodies and hinge is simulated 570 to obtain a new position of the super bodies 580*a* and 580*b* in relation to each other and revolute hinge joint 552. The three dimensional objects that are represented by super bodies 580*a* and 580*b* may then be reconstituted to reveal the simulated drawbridge motion of the door 590*b* in relation to the wall 590*a*.

Although FIGS. 5A and 5B illustrates the utilization of super bodies during motion simulation of a limited number of objects, consider the simulation of a building tipping over constructed of 10,000 blocks. There may be thousands of objects that move in a rigid fashion (i.e., clusters). Because each of these objects includes, among other things, joints between the objects, calculation of the motion for the thousands of objects including the computation of thousands of physics joints incurs a significant amount of computing resources. However, because some objects remain rigid during motion simulation (i.e., the objects do not appear to move relative to one another), some physics joints need not be calculated during motion simulation to accurately simulate and display the motion of the objects. Thus, in accordance with some embodiments discussed herein, the excess physics joints and 3D objects are removed from the calculation of motion simulation. However, as discussed in greater detail below, when a super body is constructed, sufficient data is included in the super body to enable the reconstitution of the original 3D objects from the super body.

Figure 6A:
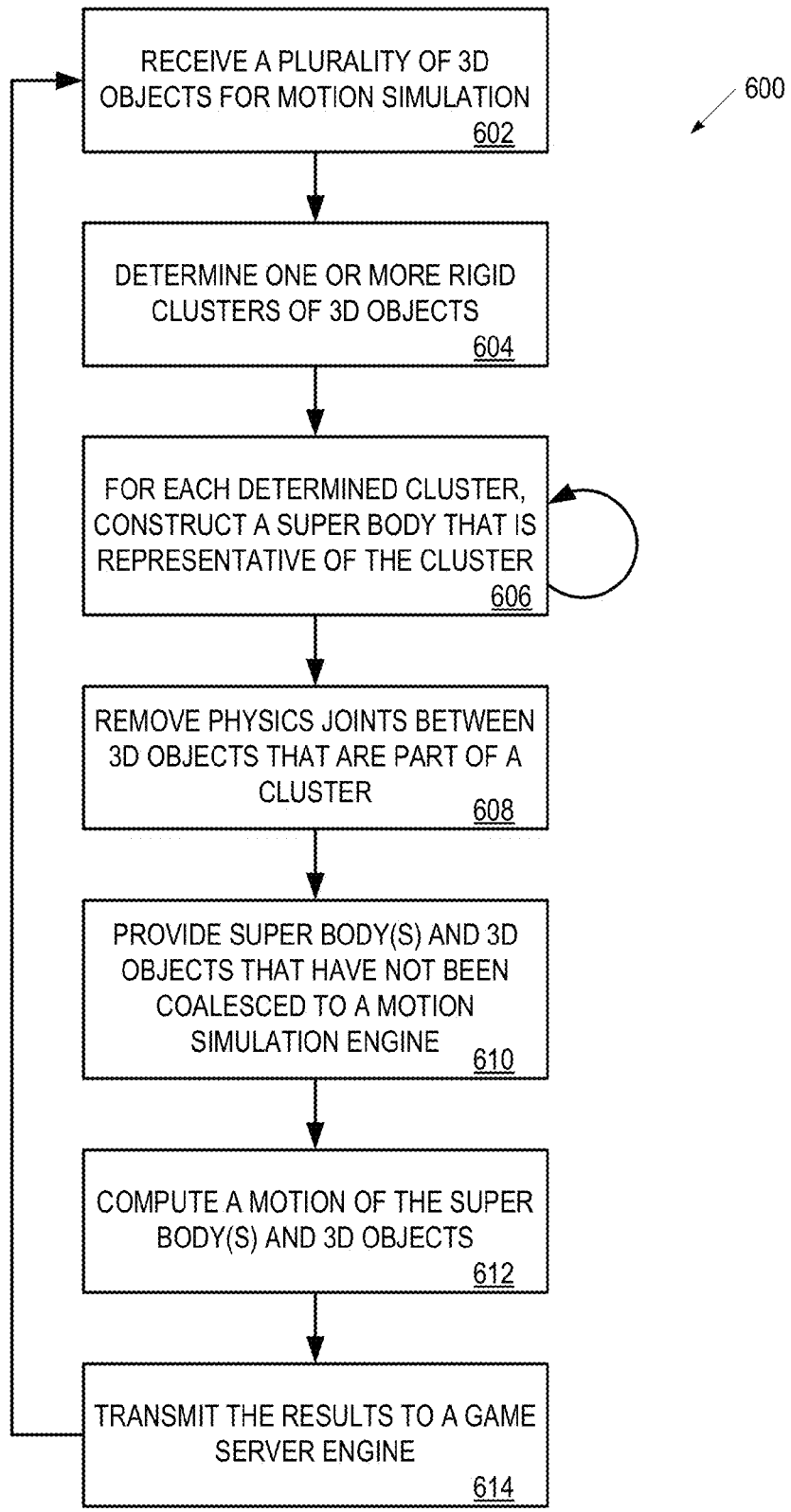
FIG. 6A is a flow diagram of one embodiment of a process for constructing and utilizing a super body in motion simulation of 3D objects.

FIG. 6A is a flow diagram of one embodiment of a process 600 for constructing and utilizing a super body in motion simulation of 3D objects. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in a game server engine 352 of FIG. 3.

Referring to FIG. 6A, process 600 begins with processing logic receiving a plurality of 3D objects, and physics joints between 3D objects, for motion simulation (processing block 602). Processing logic then analyzes the plurality of 3D objects, and physics joints, to determine one or more rigid clusters of 3D objects (processing block 604). In one embodiment a graph, that represents the 3D object/physics joint relationships between the plurality of 3D objects, is analyzed. Rigid 3D objects are objects that may be connected by rigid physics joints (i.e., weld joints, snap joints, etc.), such that when the objects are put in motion, they do not change position relative to each other during a frame of motion. A grouping of 3D objects that are determined to be rigid, relative to each other, during a frame of motion simulation can be referred to as a cluster. Furthermore, the 3D objects the make up a cluster can be referred to as cluster bodies.

Processing logic constructs a super body that is representative of a cluster, for each cluster that was determine to be rigid (processing block 606). An embodiment for constructing a super body from a cluster of 3D objects is discussed below in conjunction with FIG. 7.

After a super body has been computed for each cluster, processing logic removes the physics joints between 3D objects that are part of a super body (processing block 608). However, physics joints remain between 3D objects that are not part of super bodies, between 3D objects and super body(s), and between two or more super bodies.

For example, if an opening door is being simulated in a 3D environment, the door may be represented by a super body, and all physics joints between door objects are removed. A wall that the door is connected to may also be represented by a super body, and all physics joints between wall objects are removed. However, the door super body and wall super body are connected to each other via a hinge joint (or some other type of physics joint), where the hinge joint is not removed by processing logic.

Processing logic then provides the constructed super body(s), 3D objects that have not been coalesced into a super body, and any remaining physics joints, to a motion simulation engine (processing block 610). As noted above, by removing unnecessary joints and simulating the motion of a super body, instead of each 3D object that makes up a super body, the computational resources necessary for motion simulation are reduced. Furthermore, available processing resources provide a more efficient computation for motion simulation as the number of computations needed is reduced.

A motion of the 3D objects and super body(s) is computed (processing block 612). In one embodiment, a physics engine utilizes the mass, moment of inertia, center of mass, velocity, acceleration, etc. of 3D objects, including super body(s), to determine the positions and velocities of objects in a 3D virtual environment. In one embodiment, the determined positions, velocities, etc. of the super body(s) may be stored as data in the super body.

Processing logic then transmits the results (processing block 614). In one embodiment, the positions of non-clustered bodies (i.e., those that are not part of a super body) and super body(s) are transmitted. Because super body(s) are transmitted in place of the individual objects that make up those super body(s), network bandwidth consumed by the transmission is conserved because less information, i.e., individual objects positions and physics joints between those objects, is transmitted in order to provide the simulated positions of the objects.

In one embodiment, a physics engine at an online gaming service performs the motion computation, and then transmits the results to one or more client systems. In another embodiment, a client system manipulates, edits, or otherwise interacts with 3D objects and the modifications are transmitted from the client system to the online gaming service. Furthermore, in a local motion simulation engine (i.e., a client system running a local 3D virtual environment), the results may be transmitted internal to the client system.

Because motion is simulated on a frame by frame basis, and depending on the current condition of a system of 3D objects, the status of physics joints may change from one frame to another. As such, after the motion simulation results have been transmitted, the process returns to processing block 602 to again analyze the 3D objects, compute super body(s), etc.

Figure 6B:
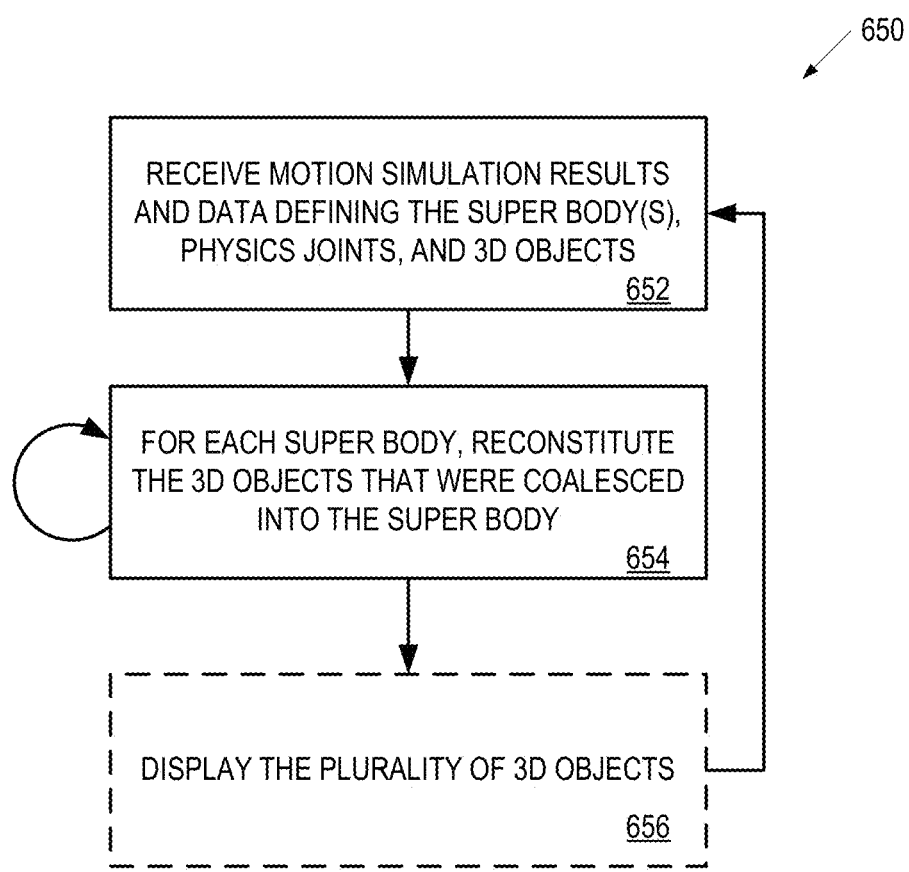
FIG. 6B is a flow diagram of one embodiment of a process for reconstituting 3D objects from one or more super body(s) during motion simulation.

FIG. 6B is a flow diagram of one embodiment of a process 650 for reconstituting 3D objects from one or more super body(s) during motion simulation. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in a game server engine 108 of a client system of FIG. 1A or a game server engine 158 of a web browser application of FIG. 1B.

Referring to FIG. 6B, process 650 begins with processing logic receiving motion simulation results, from processing block 614 of FIG. 6A, including data defining constructed super body(s), 3D objects, and physics joints (processing block 652). For each super body received in the motion simulation results, processing logic reconstitutes the 3D objects that were coalesced into a super body (processing block 654). The reconstitution of 3D objects from a super body is discussed in greater detail below with respect to FIG. 8.

After each super body has been reconstituted by processing logic, the plurality of 3D objects is optionally rendered by processing logic (processing block 656). In one embodiment, the rendering of 3D objects is optional, as illustrated by the dashed line, because systems such as online game server do not necessarily render 3D objects, but instead receive 3D objects as the result of client edit operations. However, when client systems navigate 3D environments, the clients display the 3D objects to a user.

Because motion is simulated on a frame by frame basis, processing logic returns to processing block 652 to await receiving a new frame of 3D objects.

Figure 7:
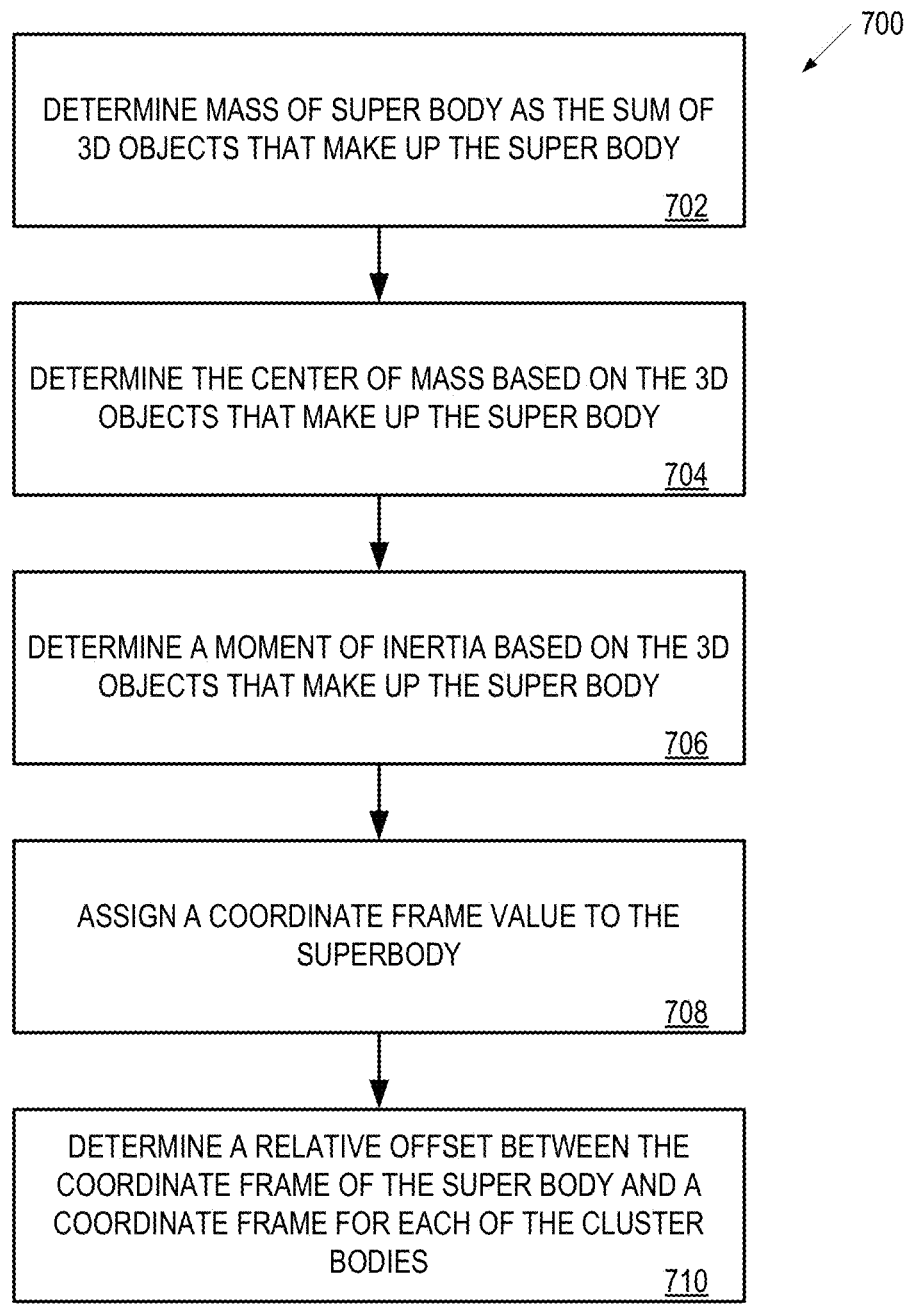
FIG. 7 is a flow diagram of one embodiment of a process for constructing a super body from a plurality of rigid 3D objects.

FIG. 7 is a flow diagram of one embodiment of a process 700 for constructing a super body from a plurality of rigid 3D objects. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in a game server engine 352 of an online gaming service 300 of FIG. 3.

Referring to FIG. 7, process 700 begins with processing logic determining a mass of the super body (processing block 702). In one embodiment, the mass of a super body is determined by summing the masses of the 3D objects that compose the super body:

$$M_s = \Sigma m_i$$

where $M_s$ is the super body mass, and $m_i$ is the mass of the $i^{th}$ 3D object from 3D objects 1 ... N that make up a super body.

Processing logic then determines the center of mass for the super body (processing block 704). In one embodiment, the center of mass for the super body is determined by:

$$R_s = \frac{\sum r_i m_i}{\sum m_i}$$

where the center of mass of the super body is the center of mass for the system/group of 3D objects that make up the super body. In one embodiment, the super body's center of mass is defined as the average of each 3D objects position $r_i$ weighted by the 3D object's mass $m_i$.

Processing logic further determines a moment of inertia for the super body (processing block 706). In one embodiment, the moment of inertia is calculated to model the group moment of inertia of the rigid objects that make up the super body. In one embodiment, the parallel axis theorem is utilized to determine the moment of inertia for the super body.

In one embodiment, the moment of inertia is determined utilizing the parallel axis, by first defining a coordinate frame that describes the super body as being aligned with the largest rigid object that is part of the super body. The moments of inertia of the rigid objects are then calculated with respect to their own center of mass in the same coordinate frame orientation as the super body. The moments of inertia are also calculated for each rigid object relative to the center of mass and coordinate frame of the super body. Each of these inertias is summed in order to compute the moment of inertia of the super body in processing block 706.

A coordinate frame is then assigned to the super body (processing block 708). A coordinate frame is a reference coordinate for the super body, which is expressed in reference to the coordinates of a system, virtual environment, etc. In one embodiment, the coordinate frame assigned to the super body is the center of mass determined at processing block 704. However, other conventions for assigning a coordinate frame to the super body may be utilized.

After the super body has been assigned a coordinate frame, processing logic determines a relative offset between the coordinate frame of the super body and a coordinate frame for each of the 3D objects that makes up the super body (processing block 710).

Figure 8:
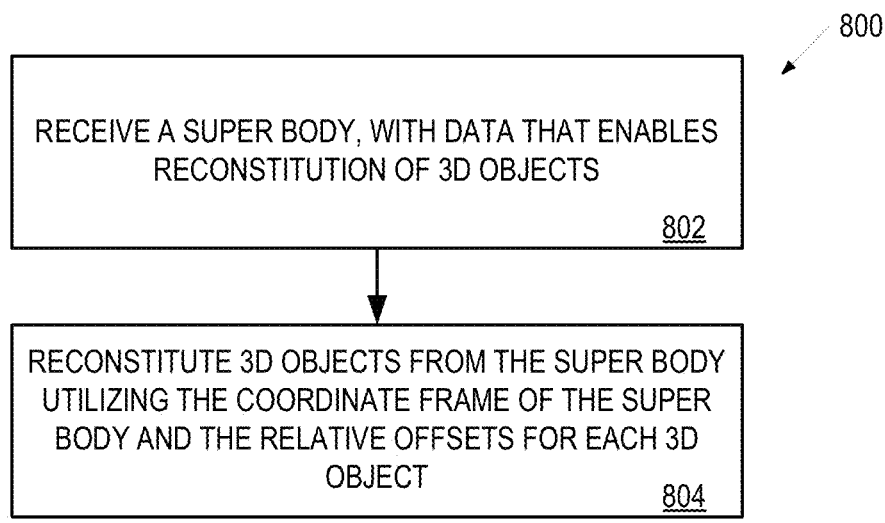
FIG. 8 is a flow diagram of one embodiment of a process for reconstituting 3D objects from a super body after motion simulation.

FIG. 8 is a flow diagram of one embodiment of a process 800 for reconstituting 3D objects from a super body after motion simulation. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in a game server engine 108 of a client system of FIG. 1A, or a game server engine 158 of a web browser application of FIG. 1B.

Referring to FIG. 8, process 800 begins with processing logic receiving a super body, with data that will enable reconstitution of the 3D objects (processing block 802). In one embodiment, the data that enables reconstitution is the coordinate frame assigned to the super body after motion simulation, and the relative offset values for each 3D object that makes up the super body. Processing logic then utilizes the relative offsets in relation to the super body's coordinate frame to reconstitute the position of each of the 3D objects (processing block 804).

In one embodiment, processing logic, at processing blocks 702-706 generates physical data utilized by a physics engine to calculate, and simulate, a motion of the super body. At processing blocks 708 and 710, processing logic generates positional data that will be utilized when 3d objects are reconstituted from the computed motion of a super body. Processing logic then utilizes the positional data, at processing blocks 802 and 804 to reconstitute the 3D objects. For example, a super body's mass and center of mass are inputted into a physics engine for motion simulation. The motion simulation will impact, or move, the coordinate frame assigned to the super body. Then, the 3D objects can be reconstituted from the super body based on the calculated motion (i.e., new position, velocity, etc. of the super body), by adjusting the position of the 3D objects based on the coordinate frame for the super body and the determined relative offset of each 3D object in relation to the super body's motion adjusted coordinate frame.

Figure 9:
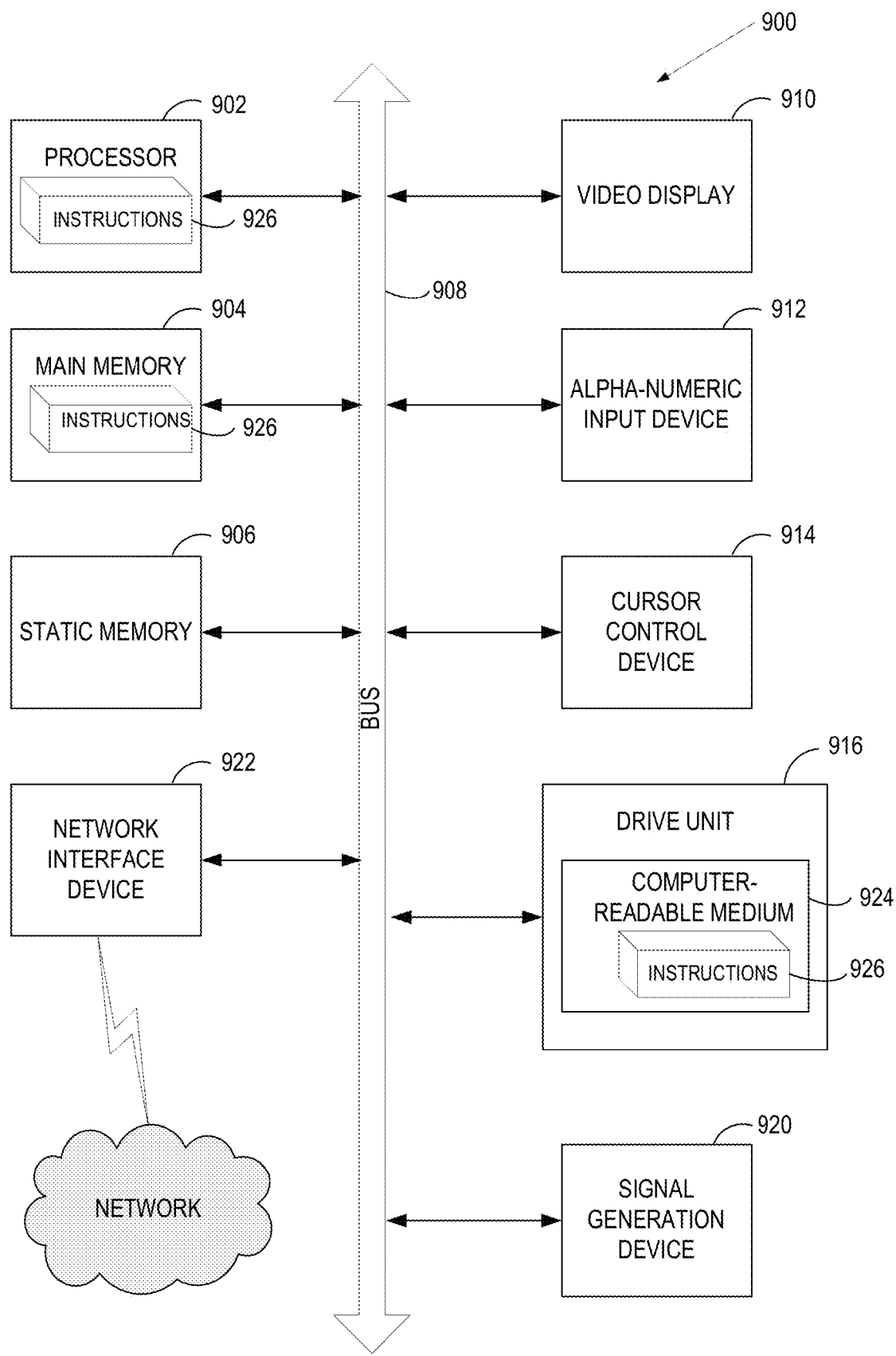
FIG. 9 is a block diagram of one embodiment of a computer system.

FIG. 9 shows a diagrammatic representation of machine in the exemplary form of a computer system 900 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 900 includes a processor 902, a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alpha-numeric input device 912 (e.g. a keyboard), a cursor control device 914 (e.g. a mouse), a disk drive unit 916, a signal generation device 920 (e.g., a speaker) and a network interface device 922.

The disk drive unit 916 includes a computer-readable medium 924 on which is stored a set of instructions (i.e., software) 926 embodying any one, or all, of the methodologies described above. The software 926 is also shown to reside, completely or at least partially, within the main memory 904 and/or within the processor 902. The software 926 may further be transmitted or received via the network interface device 922. For the purposes of this specification, the term "computer-readable medium" shall be taken to include any medium that is capable of storing or encoding a sequence of instructions for execution by the machine and that cause the machine to perform any one of the methodologies of the present invention. The term "computer-readable medium" shall accordingly be taken to include, but not be limited to, solid-state memories, and optical and magnetic disks.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computerized method, comprising:
receiving a plurality of three dimensional objects for motion simulation;
determining at least two three dimensional objects from the plurality of three dimensional objects that are connected by a rigid joint, wherein the determined at least two three dimensional objects do not move relative to each other during motion simulation;
constructing a super body that represents the determined at least two three dimensional objects, wherein the super body is constructed without a joint between the determined at least two three dimensional objects;
computing a motion of the super body at a physics simulation engine to simulate motion of the super body and any remaining three dimensional objects that are not represented by the super body, wherein the motion of the super body is simulated without simulating a motion of each of the determined at least two three dimensional objects, to reduce computational resources of the physics simulation engine; and
transmitting information associated with the super body over a network, wherein the information associated with the super body is transmitted without transmitting information associated with each of the determined at least two three-dimensional objects, to reduce network bandwidth consumed by the transmission.

2. The method of claim 1, further comprising:
transmitting the determined motion over the network, including data indicative of the at least two three dimensional objects to enable reconstituting; and
reconstituting the at least two three dimensional objects based on the computed motion of the super body to simulate a motion of the plurality of three dimensional objects.

3. The method of claim 2, further comprising:
displaying the plurality of three dimensional objects based on the determined motion to simulate motion of the three dimensional objects on a display device.

4. The method of claim 2, wherein a current super body is computed from the plurality of three dimensional objects, and transmitted over the network for each frame of motion simulation.

5. The method of claim 2, wherein transmitting the super body and the determined motion over a network occurs in a multiplayer online environment.

6. The method of claim 2, wherein the transmitting the super body and the determined motion over a network occurs in a game development environment.

7. The method of claim 1, wherein constructing a super body further comprises:
assigning a coordinate frame to the super body;
calculating a relative offset of a coordinate frame for each of the determined at least two three dimensional objects from the coordinate assigned to the super body; and
reconstituting each of the determined at least two three dimensional objects based on the computed motion of the super body and the relative offset of the coordinate frame for each of the determined at least two three dimensional objects.

8. The method of claim 7, wherein determining a coordinate frame for the super body further comprises:
determining a mass, center of mass, and moment of inertia for the super body based on three dimensional objects that compose the super body.

9. The method of claim 8, wherein the coordinate frame for the super body is defined by the center of mass for the super body.

10. A non-transitory computer readable storage medium that provides instructions, which when executed on a processing system, cause said processing system to perform a method comprising:
receiving a plurality of three dimensional objects for motion simulation;
determining at least two three dimensional objects from the plurality of three dimensional objects that are connected by a rigid joint, wherein the determined at least two three dimensional objects do not move relative to each other during motion simulation;
constructing a super body that represents the determined at least two three dimensional objects, wherein the super body is constructed without a joint between the determined at least two three dimensional objects; and
computing a motion of the super body at a physics simulation engine to simulate motion of the super body and any remaining three dimensional objects that are not represented by the super body, wherein the motion of the super body is simulated without simulating a motion of each of the determined at least two three dimensional objects, to reduce computational resources of the physics simulation engine; and
transmitting information associated with the super body over a network, wherein the information associated with the super body is transmitted without transmitting information associated with each of the determined at least two three-dimensional objects, to reduce network bandwidth consumed by the transmission.

11. The non-transitory computer readable storage medium of claim 10, further comprising:
transmitting the determined motion over the network, including data indicative of the at least two three dimensional objects to enable reconstituting; and
reconstituting the at least two three dimensional objects based on the computed motion of the super body to simulate a motion of the plurality of three dimensional objects.

12. The non-transitory computer readable storage medium of claim 11, further comprising:
displaying the plurality of three dimensional objects based on the determined motion to simulate motion of the three dimensional objects on a display device.

13. The non-transitory computer readable storage medium of claim 11, wherein a current super body is computed from the plurality of three dimensional objects, and transmitted over the network, for each frame of motion simulation.

14. The non-transitory computer readable storage medium of claim 11, wherein transmitting the super body and the determined motion over a network occurs in a multiplayer online environment.

15. The non-transitory computer readable storage medium of claim 11, wherein the transmitting the super body and the determined motion over a network occurs in a game development environment.

16. The non-transitory computer readable storage medium of claim 10, wherein constructing a super body further comprises:
assigning a coordinate frame to the super body;
calculating a relative offset of a coordinate frame for each of the determined at least two three dimensional objects from the coordinate from assigned to the super body; and
reconstituting each of the determined at least two three dimensional objects based on the computed motion of the super body and the relative offset of the coordinate frame for each of the determined at least two three dimensional objects.

17. The non-transitory computer readable storage medium of claim 16, wherein determining a coordinate frame for the super body further comprises:
determining a mass, center of mass, and moment of inertia for the super body based on three dimensional objects that compose the super body.

18. The non-transitory computer readable storage medium of claim 17, wherein the coordinate frame for the super body is defined by the center of mass for the super body.

19. A system comprising:
an assembly solver engine to,
receive a plurality of three dimensional objects for motion simulation;
determine at least two three dimensional objects from the plurality of three dimensional objects that are connected by a rigid joint, wherein the determined at least two three dimensional objects do not move relative to each other during motion simulation,
construct a super body that represents the determined at least two three dimensional objects, wherein the super body is constructed without a joint between the determined at least two three dimensional objects;
a physics simulation engine, coupled to the rigid body dynamics solver, to compute a motion of the super body to simulate motion of the super body and any remaining three dimensional objects that are not represented by the super body, wherein the motion of the super body is simulated without simulating a motion of each of the determined at least two three dimensional objects, to reduce computational resources of the physics simulation engine; and
a server to transmit information associated with the super body over a network, wherein the information associated with the super body is transmitted without transmitting information associated with each of the determined at least two three-dimensional objects, to reduce network bandwidth consumed by the transmission.

20. The system of claim 19, further comprises:
the server to further transmit the the determined motion over the network; and
a user system to,
- receive the super body and the determined motion,
- reconstitute the two or more three dimensional objects based on a computed motion of the super body, and data indicative of the at least two three dimensional objects, to simulate a motion of the plurality of three dimensional objects, and
- to display the plurality of three dimensional objects based on the determined motion to simulate motion of the three dimensional objects on a display device coupled with the user system.

21. The system of claim 20, wherein a current super body is computed from the plurality of three dimensional objects, and transmitted to the user system, for each frame of motion simulation displayed on the display device coupled with the user system.

* * * * *